US008930298B2

(12) United States Patent
Demuth et al.

(10) Patent No.: US 8,930,298 B2
(45) Date of Patent: Jan. 6, 2015

(54) RULES ENGINE ECOSYSTEM DEVELOPED WITH AN OBJECT CACHE FRAMEWORK

(75) Inventors: Steven J. Demuth, Decorah, IA (US); Edward M. Lynch, Toronto (CA); Stéphane Méry, Roquefort les Pins (FR); Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 13/367,981

(22) Filed: Feb. 7, 2012

(65) Prior Publication Data

US 2013/0132326 A1 May 23, 2013

(30) Foreign Application Priority Data

Nov. 22, 2011 (EP) .................................... 11306530

(51) Int. Cl.
*G06N 5/02* (2006.01)
(52) U.S. Cl.
CPC ...................................... *G06N 5/025* (2013.01)
USPC .......................................................... 706/48
(58) Field of Classification Search
None
See application file for complete search history.

(56) References Cited

U.S. PATENT DOCUMENTS

| 7,546,419 | B2 * | 6/2009 | Aguera y Arcas | 711/133 |
| 2007/0094199 | A1 * | 4/2007 | Deshpande et al. | 706/47 |
| 2008/0155517 | A1 | 6/2008 | Yan et al. | |
| 2008/0256047 | A1 * | 10/2008 | Dettinger et al. | 707/4 |
| 2009/0157586 | A1 * | 6/2009 | Zhang et al. | 706/47 |
| 2012/0250632 | A1 * | 10/2012 | Mo et al. | 370/329 |

OTHER PUBLICATIONS

"Rule Object 2001: A Pattern Language for Adaptive and Scalable Business Rule Construction", Ali Arsanjani, Proc. of the 8th Conference on Pattern Languages of Programs (PLoP), 2001, pp. 1-33.*
J2EE object-caching frameworks—Improve performance in Web portal applications by caching objects, Srini Penchikala, JavaWorld, May 31, 2004, 7 pages.*
Thomsen, Erik , "Information Impact: Business Analytics Revealed", Intelligent Enterprise, v 4, n 9, ISSN: 1524-3621, CMP Media Inc, USA Jun. 13, 2001 , pp. 27-34.
Mehmet Sayal, "Detecting Time Correlations in Time-Series Data Streams", Source: Technical Report, Intelligent Enterprise Technologies Laboratory HP Laboratories Palo Alto HPL-2004-103 Publisher: www.hpl.hp.com Jun. 9, 2004, 10 pages.

* cited by examiner

*Primary Examiner* — Kakali Chaki
*Assistant Examiner* — Mai T Tran
(74) *Attorney, Agent, or Firm* — DeLizio Gilliam, PLLC (57) ABSTRACT

An object cache framework client selects a rule-set object in an object cache framework. The rule-set object comprises a rule-set (set of business rules). The object cache framework client evaluates criteria of the rule-set against properties of a plurality of rules engines. The object cache framework client determines if the properties of a rules engine, from a plurality of rules engines, satisfy the criteria of the rule-set. The object cache framework client supplies the rule-set object to the rules engine for execution of the rule-set.

21 Claims, 5 Drawing Sheets

FIG. 5 though the description refers to IBM® ObjectGrid technology for matching a rule-set with a rules engine, embodiments do not require an ObjectGrid client. In other instances, well-known instruction instances, protocols, structures and techniques have not been shown in detail in order not to obfuscate the description.

RULES ENGINE ECOSYSTEM DEVELOPED WITH AN OBJECT CACHE FRAMEWORK

BACKGROUND

Embodiments of the inventive subject matter generally relate to the field of rules engine computing, and, more particularly, to a business rules engine ecosystem.

Business rules reflect business policies, examples of which include discount schemes for products, conditions for bank loans, etc. Business rules are defined by business owners or people with decision making authority. Business rules are written in the form of computer program instructions by rule developers. A business rules engine is a computing resource(s) that executes one or more business rules. A business rule typically consists of two parts: a condition and an action. A business rules engine evaluates the condition and then performs the action accordingly.

SUMMARY

Embodiments of the inventive subject matter include a method for matching a rule-set with a rules engine. The method selects a rule-set object in an object cache framework. The rule-set object comprises a rule-set and the rule-set indicates a set of one or more criteria for matching the rule-set to a rules engine. The method evaluates the set of one or more criteria of the rule-set against properties of a plurality of rules engines associated with the object cache framework. The method determines that the properties of a first of a plurality of rules engines satisfy the set of one or more criteria of the rule-set. The method supplies the rule-set object to the first of the plurality of rules engines for execution of the rule-set by the first of the plurality of rules engines.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although the description refers to IBM® ObjectGrid technology for matching a rule-set with a rules engine, embodiments do not require an ObjectGrid client. In other instances, well-known instruction instances, protocols, structures and techniques have not been shown in detail in order not to obfuscate the description.

A rules engine ecosystem provides a collaborative environment for rules engine owners, business owners (hereinafter "rule users") and rule developers. Evaluation of business rules (hereinafter "rules") requires extensive and expensive computing resources, available as rules engines and provided by rules engine owners. Rule developers possess the skills to write rules as computer program instructions. Rule users utilize the rules for business applications. A set of business rules for a business application is termed as rule-set. In the rules engine ecosystem, a rules engine is not confined to evaluating a particular rule-set. The rules engine can execute all rule-sets matching the capabilities and cost offered by the rules engine which maximizes the use of a rules engine.

Rule developers can build, test and evaluate a rule-set by paying a fee to rules engine owners as an alternative to maintaining expensive computing resources. Rule developers bill rule users when a rule-set is used by the rule users. A rules engine owner bills rule users and/or rule developers for the use of rules engine. In one implementation, a rules engine ecosystem is developed with a high performance cache framework for objects, such as Java® objects. Embodiments can extend the functionality of a client for an object cache framework and insert rules engines into the framework. An example of a cache framework is the IBM ObjectGrid. ObjectGrid framework is a WebSphere® Extended Deployment technology that provides a high performance, transactional cache for Java objects. ObjectGrid technology scales from a local cache within a single server to a vast array of distributed and scalable data services spread across ObjectGrid clusters throughout an entire enterprise. An ObjectGrid client consists of program instructions to facilitate interaction of an application with the ObjectGrid. For example, the client facilitates adding new objects to the ObjectGrid.

A rules engine ecosystem leverages an object cache framework. In a rules engine ecosystem, a distributed object cache framework client (hereinafter "client") matches criteria of a rule-set with capabilities of rules engines. The client can also consider price when matching a rule-set to rules engines. On finding a match, the client assigns the rule-set to an appropriate rules engine for execution. A result of execution of the rule-set is inserted into the distributed object cache framework and/or sent to a destination specified in the rule-set. The rules engine ecosystem provides choices to rule users, rule developers and rules engine owners. The choices lower the effective cost of building and executing a rule-set. The rules engine ecosystem also promotes efficient utilization of rules engines in the rules engine ecosystem.

Figure 1:
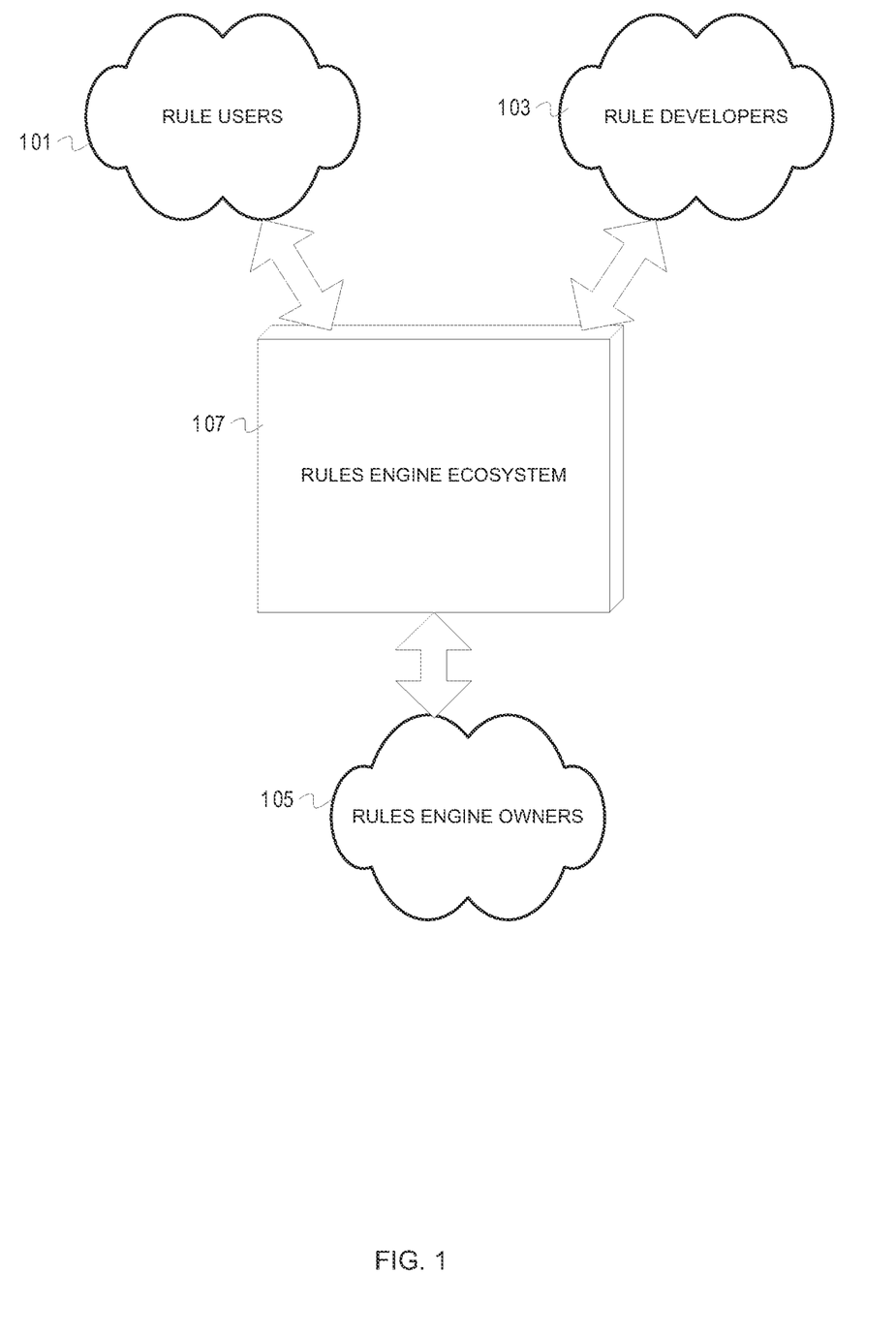
FIG. 1 depicts a conceptual diagram for a rules engine ecosystem.

FIG. 1 depicts a conceptual diagram of a rules engine ecosystem. FIG. 1 depicts multiple entities including rule users 101, rule developers 103, rules engine owners 105, and a rules engine ecosystem 107. FIG. 1 depicts the rules engine ecosystem 107 allows negotiation and interaction among the rule users 101, rule developers 103 and the rules engine owners 105.

The rules engine owners 105 publish properties of their rules engines. Examples of rules engine properties include capabilities of the rules engine and cost for the rules engine to execute rule-sets. The capabilities of a rules engine can include type of rules a rules engine can execute, number of rules a rules engine can execute, processing time, available security, configuration in which the rules engine can accept rule-sets, etc. The rules engine owners 105 make revenue when a rules engine is utilized by rule developers and/or rule users.

The rule developers 103 write computer program instructions for rule-sets into the rules engine ecosystem. Before a rule-set is made available to rule users, the rule developers 103 can test rule-sets using the rules engine by paying a fee to rules engine owners 105. Depending on processing power, processing time desired for testing the rule-set, etc., the rule developers 103 submit payment preferences to the rules engine ecosystem 107. The rule developers 103 can make revenue by billing the rule users 101 each time a rule-set is utilized by the rule users 101.

The rule users 101 have the choice of selecting a rules engine based on parameters like processing power, time constraints, etc., and pay accordingly to the rules engine owners 105. The rule users 101 also have a choice of selecting a rule-set from the available rule-sets that best fits their business requirements. The availability of choice for selecting a combination of rule-set and rule-engine most desirable to the rule users 101 can drive down costs for the rule users 101.

Figure 2:
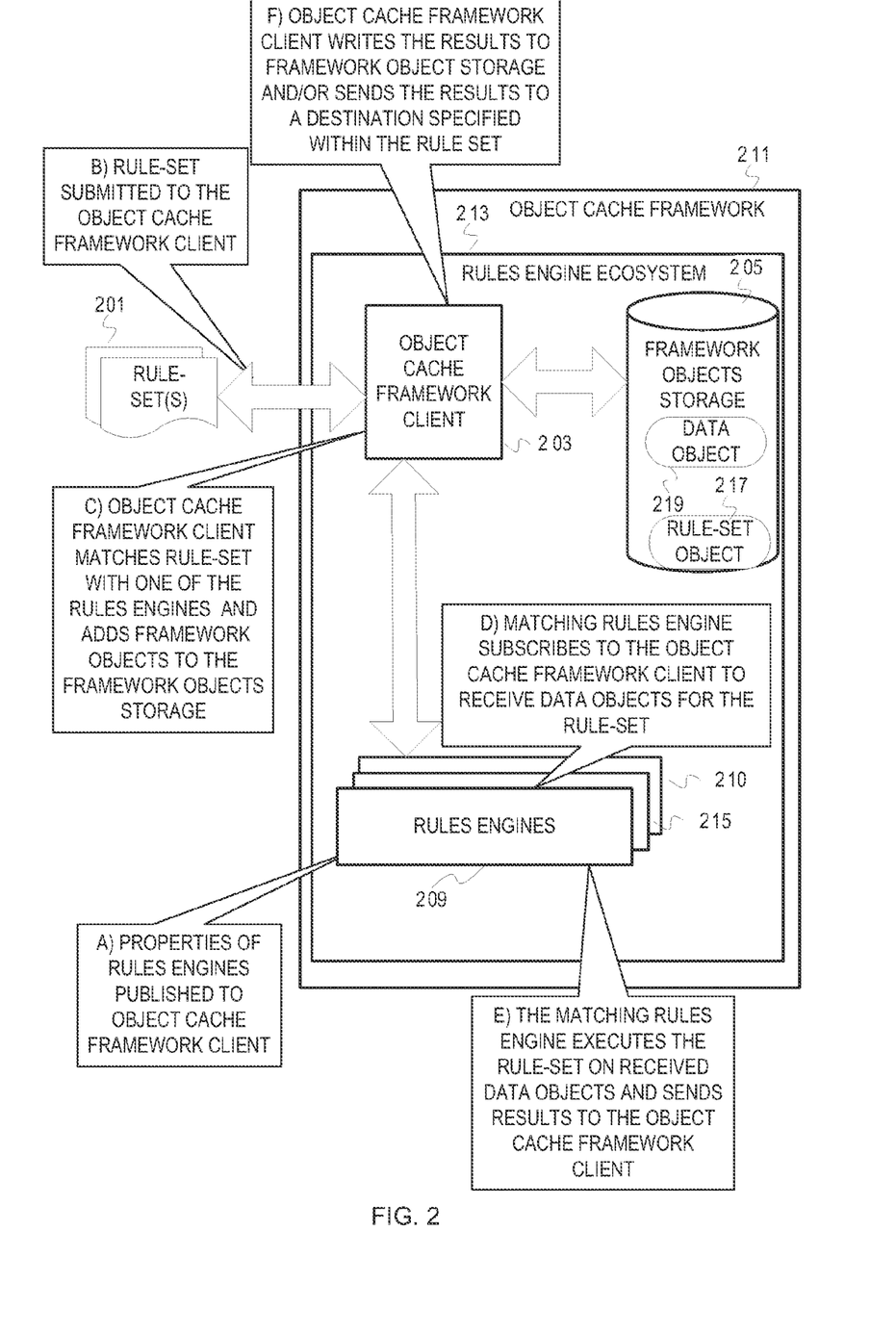
FIG. 2 depicts a conceptual diagram of example processing in a rules engine ecosystem.

FIG. 2 depicts a conceptual diagram of example processing in a rules engine ecosystem. FIG. 2 illustrates multiple entities including a rule-set(s) 201; rules engines 209, 210, and 215; an object cache framework client 203; a framework objects storage 205; a rules engines 209; an object cache framework 211; a rule-set object 217; and a data object 219. The framework objects storage 205 represents distributed storage of objects on different machines across the object cache framework 211. An object in the object cache framework 211 comports with a specification(s) defined for the object cache framework 211. For instance, a specification of the object cache framework 211 can define an encapsulation that wraps data, an application, a database, etc. A specification of the object cache framework 211 can also define formatting, fields, metadata, etc., expected in an encapsulation header. A rules engine ecosystem 213 leverages the object cache framework 211. The rule-set(s) 201 represents one or more rule-sets created by one or more rule developers. FIG. 2 depicts example operations for executing a rule-set in a rules engine ecosystem with a sequence of stages A through F.

At stage A, rules engine owners of the rules engines 209, 210, 215 publish properties of the rules engine 209, 210, 215 to the object cache framework client 203. Although depicted as a single stage, publication of properties for different rules engines probably occur at different times. A rules engine owner can publish the properties with various techniques. The rules engine owner can supply the properties via an interface to the object cache framework. The rule engine owner can utilize a publishing technology, such as a push publishing technology (e.g., a Comet application, a Java applet, an Extensible Messaging and Presence Protocol (XMPP) based application, etc.). In some embodiments, properties of a rules engine are communicated to the object cache framework with feed aggregation technology (e.g., really simple syndication (RSS) technology, Atom technology, etc.). One or more clients subscribe to a website, for example, maintained for/by a rule engine owner. In addition to rules engine properties, a set of conditions to offer execution of rule-sets by a rules engine can be published. Example conditions include a lower cost for executing a rule-set in a longer time period and a higher cost to provide a secure execution of a rule-set. The object cache framework 211 parameterizes the information published for a rules engine (e.g., properties and conditions) to conform to the specification(s) of the object cache framework 211. The object cache framework client 203 or a different client may parse and reformat the information to conform to framework specification(s). The object cache framework 211 may also maintain availability status of a rules engine as one of the parameters. The parameterized information is used for matching a rule-set to a rules engine within the framework 211. Although stage A depicts publication for multiple rules engines, embodiments are not intended to be limited to a single instance of publication for multiple rules engines. Properties of rules engines can be communicated to an object cache framework at different times, and those properties can be modified over time. The intent is to show that properties of multiple rules engines are communicated to the object cache framework. Furthermore, the rules engines 209, 210, 215 are part of the rules engine ecosystem 213. In other words, the rules engines 209, 210, 215 or references to the rules engines have been inserted into the object cache framework 211.

At stage B, a rule-set developer submits the rule-set 201 to the object cache framework client 203. Similar to the properties for a rules engine, a rule-set and information about the rule-set can be communicated to the object cache framework 211 with various technologies, including publishing/subscribing technologies. Information about a rule-set can be submitted separately or encapsulated within the rule-set, for example, as metadata. The rule-set 201 comprises computer program instructions that implement business rules and metadata for the rule-set. The rule-set 201 also comprises information about ontology(ies) relevant to the rule-set (e.g., an ontology that governs how data is processed when the rule-set is executed). The rule-set 201 may also include data or a path to the data. Examples of information indicated by the metadata includes a number of rules in the rule-set, computing requirements for the rule-set, time constraints for executing the rule-set, and a price that the rule-set developer is willing to pay. The metadata can indicate criteria for a rule-set and options for a rule-set. The object cache framework client 203 manipulates the rule-set 201 and rule-set information to conform to the specification(s) of the object cache framework 211, and generates a rule-set object 217. For example, the client 203 wraps the rule-set 201 with a header and metadata in accordance with a specification of the object cache framework 211. The client 203 stores the rule-set object 217 in the framework objects storage 205.

At stage C, the object cache framework client 203 looks for a match between the rule-set 201 and one or more of the rules engines 209, 210, 215 based, at least in part, on the properties of the rules engines 209, 210, 215. The object cache framework client 203 evaluates the metadata of the rule-set 201 against the properties of each of the rules engines 209, 210, 215. For instance, the client 203 looks for a match between the cost of using one of the rules engines 209, 210, 215 and a price specified in the rule-set 201 metadata. In FIG. 2, the client 203 determines that the rules engine 209 matches the rule-set 201. On determining the match, the object cache framework client 203 assigns the matching rules engine 209 to the rule-set object 217, and marks the status of the matching rules engine 209 as busy. The busy status of a rules engine indicates that the rules engine is currently unavailable for execution of other rule-set objects. In some embodiments, a busy status may also indicate that a rules engine is unavailable for matching. In some embodiments, rules engine with busy status can still be matched to rule-sets that can be executed at a later time.

At stage D, the matching one of the rules engines 209 subscribes to the client 203 to receive data objects for the rule-set object 217. The rule-set object 217 may encapsulate the data objects relevant to the rule-set and/or reference the relevant data objects. The object cache framework client 203 can also fetch relevant data objects from the framework objects storage 205 and publish them to a location to which the rules engine 209 subscribes. The rules engine 209 informs the object cache framework client 203 of reception of all required data objects Embodiments can wait to mark a rules engine as busy until after a rules engine receives all data objects and begins execution of a rule-set of a rule-set object. As the object cache framework client 203 receives new data objects, the object cache framework client 203 matches the data objects with the rule-set objects in the object cache framework 211. For example, the client 203 examines metadata and/or parameters of data objects to determining matching rule-sets. In some embodiments, the data objects will indicate the corresponding rule-sets or rule-set objects (e.g., by name, number, location, etc.). For the rule-set object 217, the client 203 sends the corresponding data objects to the rules engine 209. Data objects can be sent to the rules engine 209 by different clients. In some embodiments, the rules engine 209 subscribes to some other framework (e.g., SAP NetWeaver® technology platform, Microsoft® .NET framework, etc.) that facilitates interaction between the object cache framework 211 and the rules engine 209, to receive data.

At stage E, the rules engine 209 executes the rule-set of the rule-set object 217. Inputs to the rules engine 209 include the rule-set object 217, the data object 219, and any other relevant data objects. Results of the rule-set execution may include the rule-set object 217 with modified metadata, a data object, the rule-set object 217 with modified rules and relevant data objects, etc. In addition, metadata of the rule-set object 217 may be associated with the results. The rules engine 209 sends the results of rule-set execution to the object cache framework client 203.

At stage F, the object cache framework client 203 supplies the results in accordance with the rule-set 201. The rule-set 201 specifies what to do with results of rule-set execution. A rule-set can specify that results are to be written into an object cache framework as framework objects and/or sent to a destination outside of the object cache framework. In some cases, rule-set execution results cascade across multiple rules engines. A rule-set may specify different phases or stages that involve different rules engines. A rule-set may chain together other rule-sets. For cascading results, an object cache framework client matches the results of executing a first rule-set with an available rules engine for execution of a second rule-set derived from execution of the first rule-set. The results of executing the first rule-set can literally and/or referentially indicate the second rule-set. In some embodiments, other rules engines and rule-set objects in the object cache framework 211 also use the results as data to be operated upon. After the rules engine 209 completes execution of the rule-set 201, the object cache framework client 203 marks the rules engine 209 as available.

Figure 3:
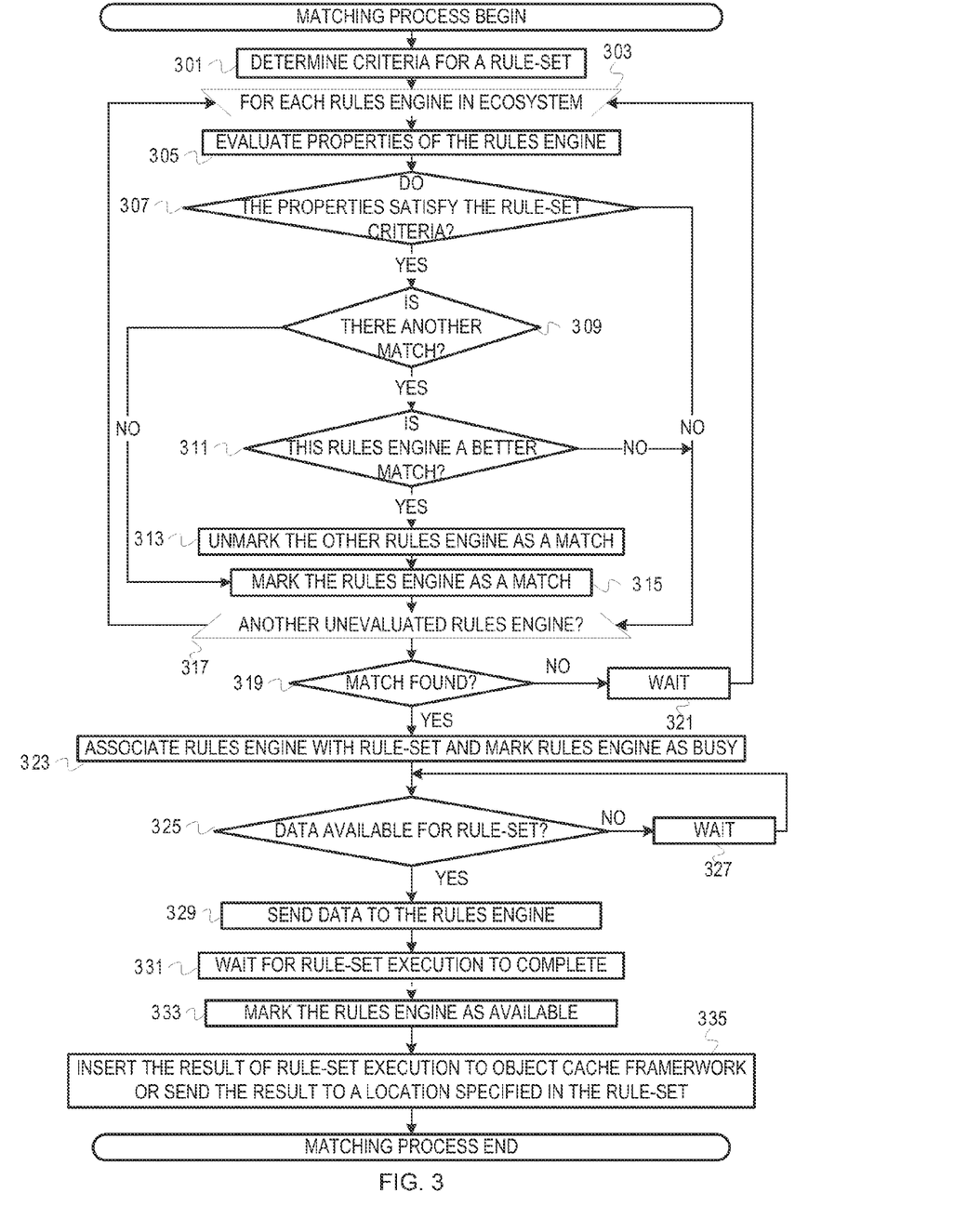
FIG. 3 illustrates a flow diagram for example operations for matching a rule-set with a rules engine.

FIG. 3 illustrates a flow diagram of example operations for matching a rule-set with a rules engine. The rule-set matching process is illustrated with an example of an object cache framework client receiving a rule-set.

At block 301, the client determines the criteria for the rule-set. The client reads the metadata associated with the rule-set. The client can store the metadata in a standard parameterized format in accordance with a specification(s) of an object cache framework. For example, the client stores the metadata of a rule-set in a table where each column represents a requirement of the rule-set.

At block 303, the client begins operations for each of the rules engines accessible in the object cache framework. The operations depicted by blocks 305, 307, 309, 311, 313, and 313 are in the loop that begins at block 303. The client selects one of the rules engines in the object cache framework. The object cache framework client can select a rules engine at random or in an order, perhaps according to properties of the rules engines.

At block 305, the client evaluates properties of the rules engine. Properties of a rules engine are available as parameters that can be compared against rule-set criteria. The client assesses the parameters of a rules engine against criteria of the rule-set. For example, a rule-set criterion indicates 100 instructions per second of processing. The client determines if the rules engine properties indicate a minimum processing power of 100 instructions per second. In some embodiments, a rule-set also indicates optional criteria.

At block 307, the client determines if the properties of the rules engine satisfy the criteria of the rule-set. If the criteria of the rule-set are satisfied by the properties of the rules engine, control flows to block 309. If the requirements of the rule-set are not satisfied, then control flows to block 317.

At block 309, the client determines if properties of another rules engine have previously been determined to satisfy the criteria of the rule-set. If properties of another rules engine are already indicated as a match, then control flows to block 311. If another rules engine is not already indicated as a match, then control flows to block 315. At block 311, the client determines if the rules engine is a better match for the rule-set than the previously matched rules engine. The client compares the properties of the rules engine currently being evaluated against the properties of the other rules engine already indicated as matching. A better match can be determined based on optional criteria (e.g., the better matching rules engine satisfies more optional criteria), based on degrees of satisfying criteria (e.g., the better matching rules engine has greater processing capabilities and/or a lower cost), etc. For example, the rule-set criteria indicate a price ceiling of $4000, and two rules engines match satisfy the price ceiling along with satisfying all other criteria. The client can possess functional intelligence based on different criteria and/or execute evaluation code associated with the rule-set. The client compares the cost properties of the two rules engines to determine the one with a lower cost. Embodiments can have conditional criteria also. For example, a rule-set can specify criteria that indicates a first price ceiling for a first level of processing speed and a second price ceiling for a second level of processing speed. If the currently selected rules engine is a better match, then control flows to block 313. If the currently selected rules engine is not a better match, then control flows to block 317.

At block 313, the client unmarks the other rules engine, which was previously indicated as a match. Embodiments can track matching rules engines during the rule-set matching process with any of a variety of data structures that associate a marker or flag with an indication of the rules engine. Embodiments can maintain an indication of all rules engines that satisfy the rule-set criteria, and then evaluate those indicated as matching for selection to execute the rule-set.

At block 315, the client marks the currently selected rules engine as a match.

At block 317, the client determines if there is an unevaluated rules engine. If there is an unevaluated rules engine, then control flows back to block 303. If no unevaluated engines remain, control flows to block 319.

At block 319, the client determines if a rules engine satisfying the criteria of the rule-set was found. If a matching rules engine was found, then control flows to block 323. If a matching rules engine was not found, then control flows to block 321.

At block 321, the client waits for a specified time-period. On expiration of the time-period, control flows back to block 303. In some embodiments, the time-period increases each time a matching rules engine is not found.

At block 323, the client associates the matching rules engine with the rule-set and marks the matching rules engine as busy. The object cache framework client associates a rules engine to the rule-set by sending a rule-set object, corresponding to the rule-set, to the matching rules engine for execution of the rule-set. The client marks the rules engine as busy by modifying the properties of the rules engine. In some embodiments, the rules engine updates its own status as busy. In some embodiments, the object cache framework maintains a data structure of rules engine statuses.

At block 325, the client determines if data for execution of the rule-set is available. If data for execution of the rule-set is available, then control flows to block 329. If data for execution of the rule-set is not available, then control flows to block 327.

At block 327, the client waits for a specified time-period. On expiration of the time-period, control flows back to block 325. In some embodiments, the time-period at block 327 increases each time the rules engine waits for data.

At block 329, the client sends the data to the rules engine. The client sends the data to rules engine by publishing the data at a location to which the rules engine subscribes. A variety of techniques can be used to supply the data to the rules engine (e.g., the client notifies the rules engine of the location of the data, an entity within the object cache framework sends a message that contains the data, etc.).

At block 331, the client waits for the rules engine to complete execution of the rule-set. On finishing execution, the rules engine sends results of the rule-set execution to the client. Embodiments can notify the client of completion in accordance with a variety of techniques (e.g., the rules engine can modify a flag variable monitored by the client, the rules engine can send a notification, etc.).

At block 333, the client marks the rules engine as available. The client may mark the rules engine as available by modifying the properties of rules engine. In some embodiments, the rules engine maintains its status itself.

At block 335, the client inserts the result(s) of the rule-set execution into the object cache framework. The rules engine may generate the result(s) to be compliant with the object cache framework (e.g., wrapped in metadata specified by the object cache framework). The client may modify the result(s) to conform to a specification(s) of the object cache framework. The client can also initiate an event to send the result(s) to a location specified in the rule-set.

The flow diagram illustrates a sequence of operations performed by an object cache framework client for a rule-set. The client can run similar sequences of operations for multiple rule-sets simultaneously, and one sequence can affect the operations of another sequence. For example, one sequence of operation can mark the status of a rules engine as available and the rules engine can serve as the right match for a rule-set of another sequence, which is waiting for a rules engine.

The operations illustrated by the flow diagram are not limited to being performed by client and can be performed by other hardware/software entities in the object cache framework. In some embodiments, a client waits for the availability of a best matching rules engine for execution of a rule-set object. In other embodiments, a rule-set object can be executed at another available rules engine, though it may not be the best match.

It should be understood that that the flow diagram is provided as an example to aid in understanding the inventive subject matter, and should not be used to limit embodiments or the scope of the claims. Embodiments can perform additional operations, fewer operations, different operations, the operations in a different order, the operation in parallel, etc. For example, embodiments can have a rule-set object queued for execution at a rules engine, instead of repeatedly finding a match between the rule-set and the rules engine requirements. Embodiments can evaluate rules engines with multiple passes. For instance, an embodiment can limit a first pass of rules engines to evaluating price. The rules engines that satisfy the price criteria are then evaluated based on scheduling availability, and then processing power. In addition, rules engines can be classified by price, processing power, technology platform, etc. A rule-set and/or the object cache framework can designate a particular class of rules engines for the rule-set, thus narrowing the number of rules engines to be evaluated.

In addition, embodiments may perform operations for chained rule-set execution previously mentioned. For example, an object cache framework client determines that a rule-set comprises rule B dependent upon results of executing rule A. The client also determines that the rule-set comprises a rule C that is dependent on results of executing both rules A and B. The client may determine the dependences when processing a rule-set for insertion into the object cache framework, and indicate the dependencies in metadata when creating the rule-set object from the rule-set. During the rule-set matching process, an object cache framework client matches rules engines Alpha Beta, and Gamma with rules A, B, and C, respectively. Association of the rules engines to the rule-set will vary with the criteria of the rule-set and properties of the rules engines. For instance, the criteria of the rule-set may indicate a willingness to pay for reservation of all three rules engines even though rules engine Gamma will be idle until execution of rules A and B are complete. Alternatively, the criteria of the rule-set may indicate a willingness to wait for availability of a rules engine at a less price competitive time. The object cache framework can associate the rules engines with the rule-set and direct the rules-engines to communicate the results to each other and/or publish the results to location(s) accessible by the rules engines.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
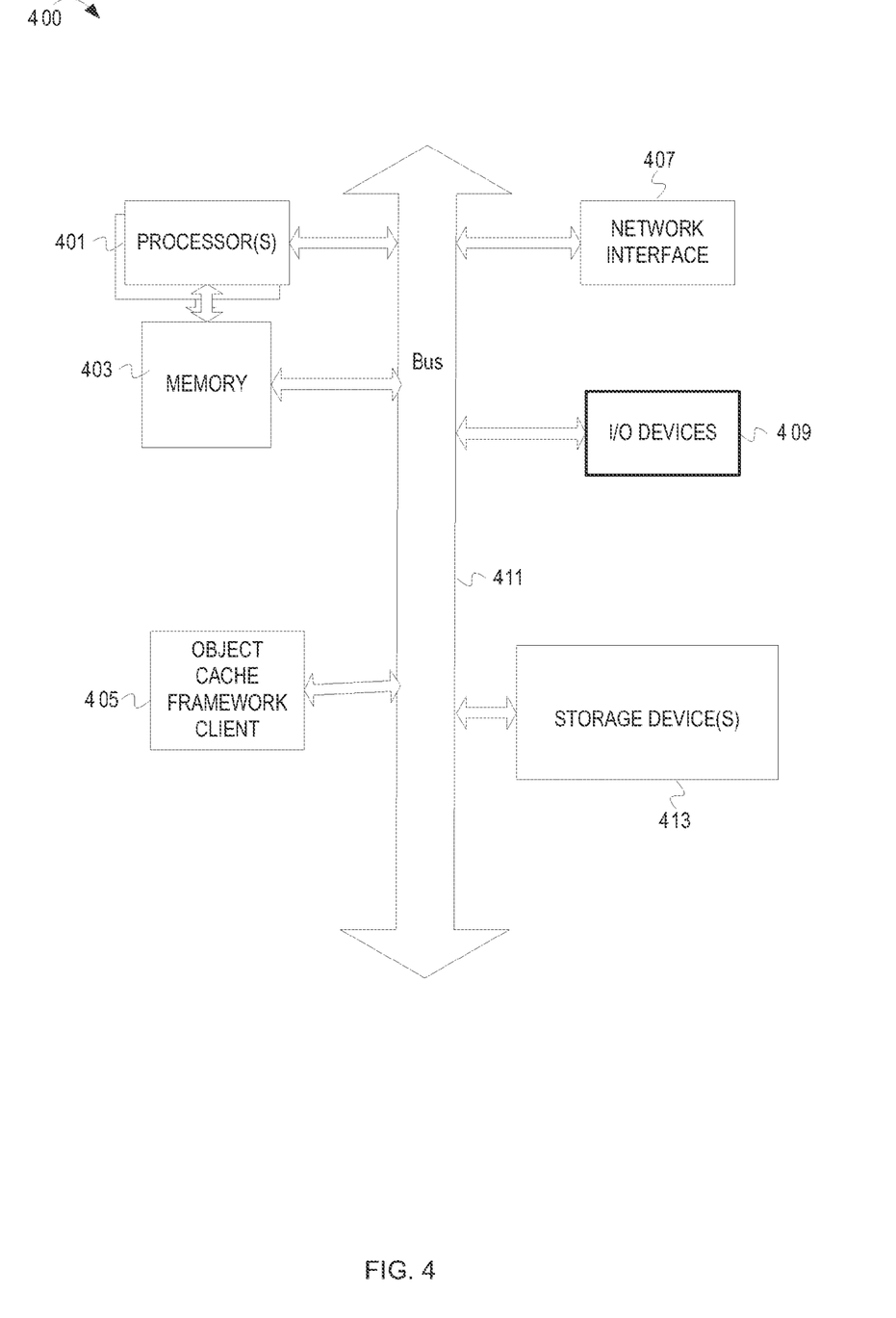
FIG. 4 depicts an example computer system.

FIG. 4 depicts an example computer system. A computer system 400 includes a processor unit 401 (possibly including multiple processors, multiple cores, multiple nodes, and/or implementing multi-threading, etc.). The computer system includes memory 403. The memory 403 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 411 (e.g., PCI, ISA, PCI-Express, HyperTransport®, InfiniBand®, NuBus, etc.), a network interface 407 (e.g., an ATM interface, an Ethernet interface, a Frame Relay interface, SONET interface, wireless interface, etc.), a storage device(s) 413 (e.g., optical storage, magnetic storage, etc.), I/O devices 409 (e.g., monitor, keyboard, etc.) and an object cache framework client 405. The object cache framework client 405 evaluates criteria of a rule-set against properties of rules engines in an object cache framework to find a rules engine with properties that satisfy the rule-set criteria. The client 405 provides data for rule-set execution to a matching rules engine, and facilitates inserting a result(s) of rule-set execution into the object cache framework and/or supplying the result(s) to a designated location. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 413, and the network interface 407 are coupled to the bus 411. Although illustrated as being coupled to the bus 411, the memory 403 may be coupled to the processor unit 401.

Figure 5:
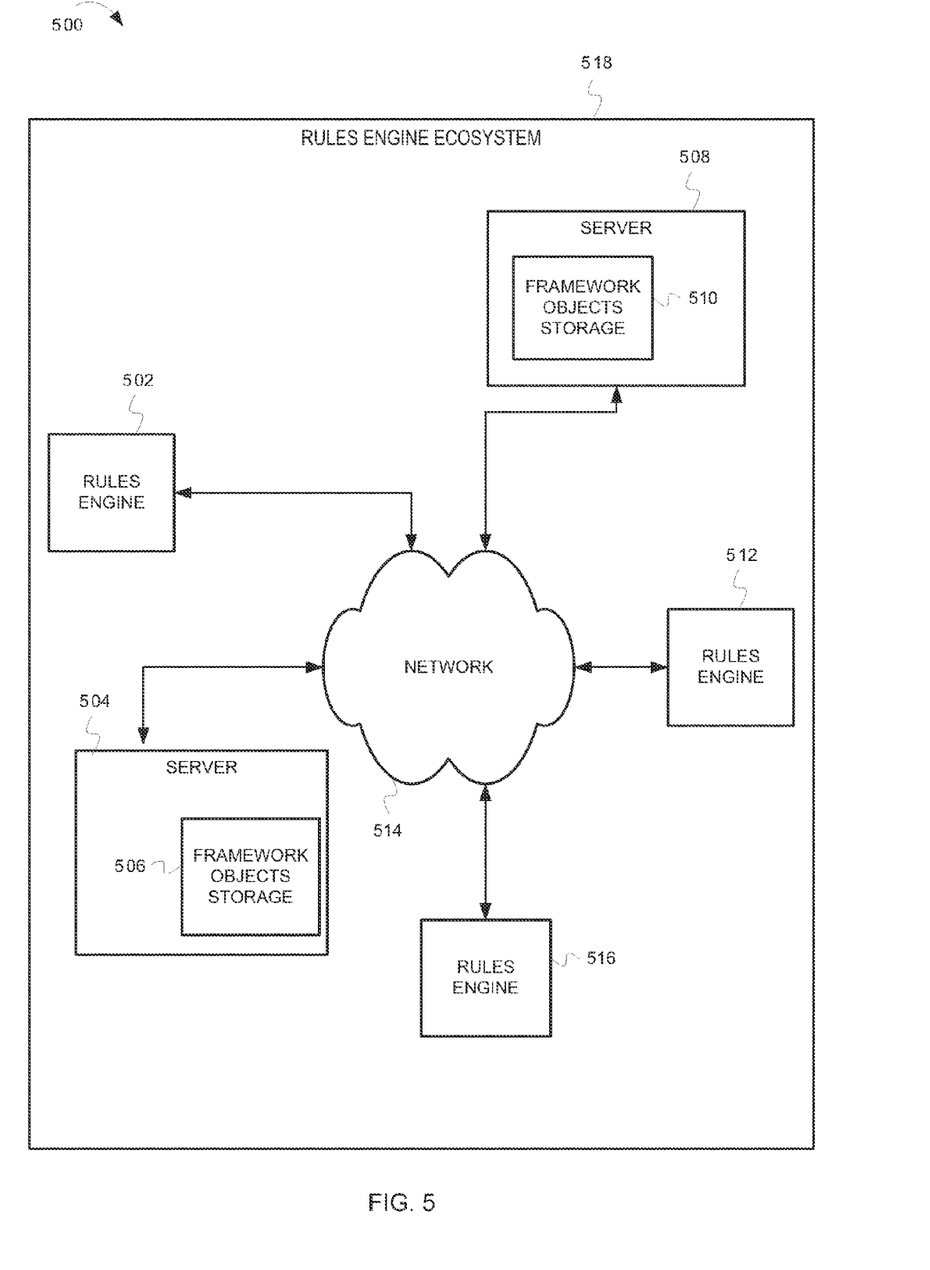
FIG. 5 depicts an example network system.

FIG. 5 depicts an example network system. The network system 500 includes a rules engine 502, a server 504, a server 508, a rules engine 512, a network 514 and a rules engine 516. A framework objects storage 506 resides in the server 504 and a framework objects storage 510 resides in the server 508. A rules engine ecosystem 518 comprises the servers and rules engines in the network system 500. The rules engine 502, the rules engine 512 and the rules engine 516 can consist of multiple computing resources (e.g., servers, computing grids, etc.). The framework objects storage 506 and the framework objects storage 510 are embodied in the storage devices (e.g. hard disk, flash memory etc.). The network 514 represents a computer network (e.g. MAN, WAN, WiMax etc.).

While the embodiments are described with reference to various implementations and exploitations, it will be understood that these embodiments are illustrative and that the scope of the inventive subject matter is not limited to them. In general, techniques for matching a rules engine with a rule-set as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
parameterizing, by an object cache framework client, properties of a plurality of rules engines in accordance with a specification of an object cache framework to generate parameterized properties of the plurality of rules engines wherein the properties of the plurality of rules engines were published to the object cache framework client;
parameterizing, by the object cache framework client, a rule-set received by the object cache framework client in accordance with the specification and generating a rule-set object that comprises the parameterized rule-set and the rule-set, wherein the rule-set indicates a set of one or more criteria for matching the rule-set to a rules engine;
evaluating, by the object cache framework client, the set of one or more criteria of the rule-set against the parameterized properties of each of the plurality of rules engines;
determining, by the object cache framework client, that the parameterized properties of a first of the plurality of rules engines satisfy the set of one or more criteria of the rule-set more than others of the plurality of rules engines;
after determining that the parameterized properties of a first of the plurality of rules engines satisfy the set of one or more criteria of the rule-set more than others of the plurality of rules engines, the object cache framework client indicating that the first of the plurality of rules engines is busy;
subscribing, by the first of the plurality of rules engines, to receive a data object for the rule-set from object storage associated with the object cache framework; and
supplying the rule-set object to the first of the plurality of rules engines for execution of the rule-set by the first of the plurality of rules engines with the data object.

2. The method of claim 1 further comprising:
receiving the rule-set submitted for insertion into the object cache framework.

3. The method of claim 1 further comprising one of wrapping the parameterized rule-set with a header and metadata in accordance with the specification and modifying the rule-set to comply with the specification.

4. The method of claim 1 further comprising:
the object cache framework client indicating to the first of the plurality of rules engines how to provide a result of execution of the rule-set; and
the first of the plurality of rules engines generating a data object with the result and providing the data object to, at least one of a location of the object cache framework, a location external to the object cache framework, or another of the plurality of rules engines, wherein the data object complies with the specification of the object cache framework.

5. The method of claim 1 further comprising:
receiving, by the object cache framework client, a result of execution of the rule-set by the first of the plurality of rules engines;
determining that the result comprises a second rule-set;
selecting a second of the plurality of rules engines based, at least in part on the second rule-set and the parameterized properties of the second of the plurality of rules engines; and
supplying the second-rule set to the second of the plurality of rules engines for execution of the second rule-set.

6. The method of claim 5, wherein the result complies with the specification of the object cache framework.

7. The method of claim 5 further comprising determining that the parameterized properties of the second of the plurality of rules engines also satisfy the set of one or more criteria of the rule-set and a criterion of the second rule-set.

8. The method of claim 5, wherein determining that the parameterized properties of the second of the plurality of rules engines satisfy the criterion of the second rule-set comprises:
evaluating, by the object cache framework client, the criterion of the second rule-set against the parameterized properties of the second of the plurality of rules engines; and
determining that the parameterized properties of the second of the plurality of rules engines satisfy the criterion of the second rule-set.

9. The method of claim 1, wherein the rule-set comprises a plurality of business rules expressed as computer program instructions, wherein each of the business rules comprises at least one condition and at least one action corresponding to the at least one condition.

10. The method of claim 1, wherein the first of the plurality of rules engines comprises one or more computing resources that execute rule-sets.

11. A computer program product for matching a rule-set with a rules engine, the computer program product comprising:
a non-transitory computer readable storage medium having computer usable program code embodied therewith, the computer usable program code comprising a computer usable program code configured to:
parameterize properties of a plurality of rules engines in accordance with a specification of an object cache framework to generate parameterized properties of the plurality of rules engines, wherein the properties of the plurality of rules engines were published to the object cache framework client;
parameterize a rule-set received by the object cache framework client in accordance with the specification and generating a rule-set object that comprises the parameterized rule-set and the rule-set, wherein the rule-set indicates a set of one or more criteria for matching the rule-set to a rules engine;
evaluate the set of one or more criteria of the rule-set against the parameterized properties of each of the plurality of rules engines;
determine that the parameterized properties of a first of the plurality of rules engines satisfy the set of one or more criteria of the rule-set more than others of the plurality of rules engines;
after a determination that the parameterized properties of the first of the plurality of rules engines satisfy the set of one or more criteria of the rule-set more than others of the plurality of rules engines, indicate that the first of the plurality of rules engines is busy;
cause the first of the plurality of rules engines to subscribe to receive a data object for the rule-set from object storage associated with the object cache framework; and
supply the rule-set object to the first of the plurality of rules engines for execution of the rule-set by the first of the plurality of rules engines with the data object.

12. The non-transitory computer readable storage medium of claim 11, wherein the computer usable program code is further configured to:
receive the rule-set submitted for insertion into the object cache framework.

13. The non-transitory computer readable storage medium of claim 11, wherein the computer usable program code is further configured to:
indicate to the first of the plurality of rules engines generate a data object with a result of execution of the rule-set and to provide the data object to, at least one of, a location of the object cache framework, a location external to the object cache framework, or another of the plurality of rules engine, wherein the data object complies with a specification of the object cache framework.

14. The non-transitory computer readable storage medium of claim 11, wherein the computer usable program code is further configured to:
receive a result of execution of the rule-set by the first of the plurality of rules engines;
determine that the result comprises a second rule-set;
select a second of the plurality of rules engines based, at least in part, on the second rule-set and the parameterized properties of the second of the plurality of rules engines; and
supply the second rule-set to the second of the plurality of rules engines for execution of the second rule-set.

15. The non-transitory computer readable storage medium of claim 14, wherein the computer usable program code configured to determine that the parameterized properties of the second of the plurality of rules engines satisfy the criterion of the second rule-set comprises computer usable program code configured to:
evaluate the criterion of the second rule-set against the parameterized properties of the second of the plurality of rules engines; and
determine that the parameterized properties of the second of the plurality of rules engines satisfy the criterion of the second rule-set.

16. A computer program product for matching a rule-set with a rules engine, the computer program product comprising:
a non-transitory computer readable storage medium having computer usable program code embodied therewith, the computer usable program code comprising a computer usable program code configured to:
parameterize properties of a plurality of rules engines in accordance with a specification of an object cache framework to generate parameterized properties of the plurality of rules engines, wherein the properties of the plurality of rules engines were published to the object cache framework client;
parameterize a rule-set received by the object cache framework client in accordance with the specification and generating a rule-set object that comprises the parameterized rule-set and the rule-set, wherein the rule-set indicates a set of one or more criteria for matching the rule-set to a rules engine;
evaluate the set of one or more criteria of the rule-set against the parameterized properties of each of the plurality of rules engines;
determine that the parameterized properties of a first rules engine of the plurality of rules engines satisfy the set of one or more criteria of the rule-set more than others of the plurality of rules engines;
after a determination that the parameterized properties of the first rules engine satisfy the set of one or more criteria of the rule-set more than others of the plurality of rules engines, indicate that the first rules engine is busy;
cause the first rules engine to subscribe to receive a data object for the rule-set from object storage associated with the object cache framework;
supply the rule-set object to the first rules engines for execution of the rule-set by the first rules engines with the data object;
receive a result of execution of the rule-set by the first rules engine;
determine that the result comprises a second rule-set; and
supply the second rule-set to a second rules engine of the plurality of rules engines for execution of the second rule-set.

17. The computer program product of claim 16, wherein the computer usable program code is further configured to allocate the first rules engine and the second rules engine for execution of the rule set and the second rule set.

18. An apparatus comprising:
a processor;
a network interface coupled with the processor; and
a non-transitory computer readable storage medium having computer usable program code embodied therewith, the computer usable program code comprising a computer usable program code configured to:
parameterize properties of a plurality of rules engines in accordance with a specification of an object cache framework to generate parameterized properties of the plurality of rules engines, wherein the properties of the plurality of rules engines were published to the object cache framework client;
parameterize a rule-set received by the object cache framework client in accordance with the specification and generating a rule-set object that comprises the parameterized rule-set and the rule-set, wherein the rule-set indicates a set of one or more criteria for matching the rule-set to a rules engine;
evaluate the set of one or more criteria of the rule-set against the parameterized properties of each of the plurality of rules engines;
determine that the parameterized properties of a first of the plurality of rules engines satisfy the set of one or more criteria of the rule-set more than others of the plurality of rules engines;
after a determination that the parameterized properties of the first of the plurality of rules engines satisfy the set of one or more criteria of the rule-set more than others of the plurality of rules engines, indicate that the first of the plurality of rules engines is busy;
cause the first of the plurality of rules engines to subscribe to receive a data object for the rule-set from object storage associated with the object cache framework; and
supply the rule-set object to the first of the plurality of rules engines for execution of the rule-set by the first of the plurality of rules engines with the data object.

19. The apparatus of claim 18, wherein the computer usable program code is further configured to:
receive the rule-set submitted for insertion into the object cache framework.

20. The apparatus of claim 18, wherein the computer usable program code is further configured to:
indicate to the first of the plurality of rules engines generate a data object with a result of execution of the rule-set and to provide the data object to, at least one, of a location of the object cache framework, a location external to the object cache framework, or another of the plurality of rules engines, wherein the data object complies with a specification of the object cache framework.

21. The apparatus of claim 18, wherein the computer usable program code is further configured to:
receive a result of execution of the rule-set by the first of the plurality of rules engines;

determine that the result comprises a second rule-set; and
select a second of the plurality of rules engines based, at least in part, on the second rule-set and the parameterized properties of the second of the plurality of rules engines; and
supply the second-rule set to the second of the plurality of rules engines for execution of the second rule-set.

* * * * *